United States Patent Office 3,697,410
Patented Oct. 10, 1972

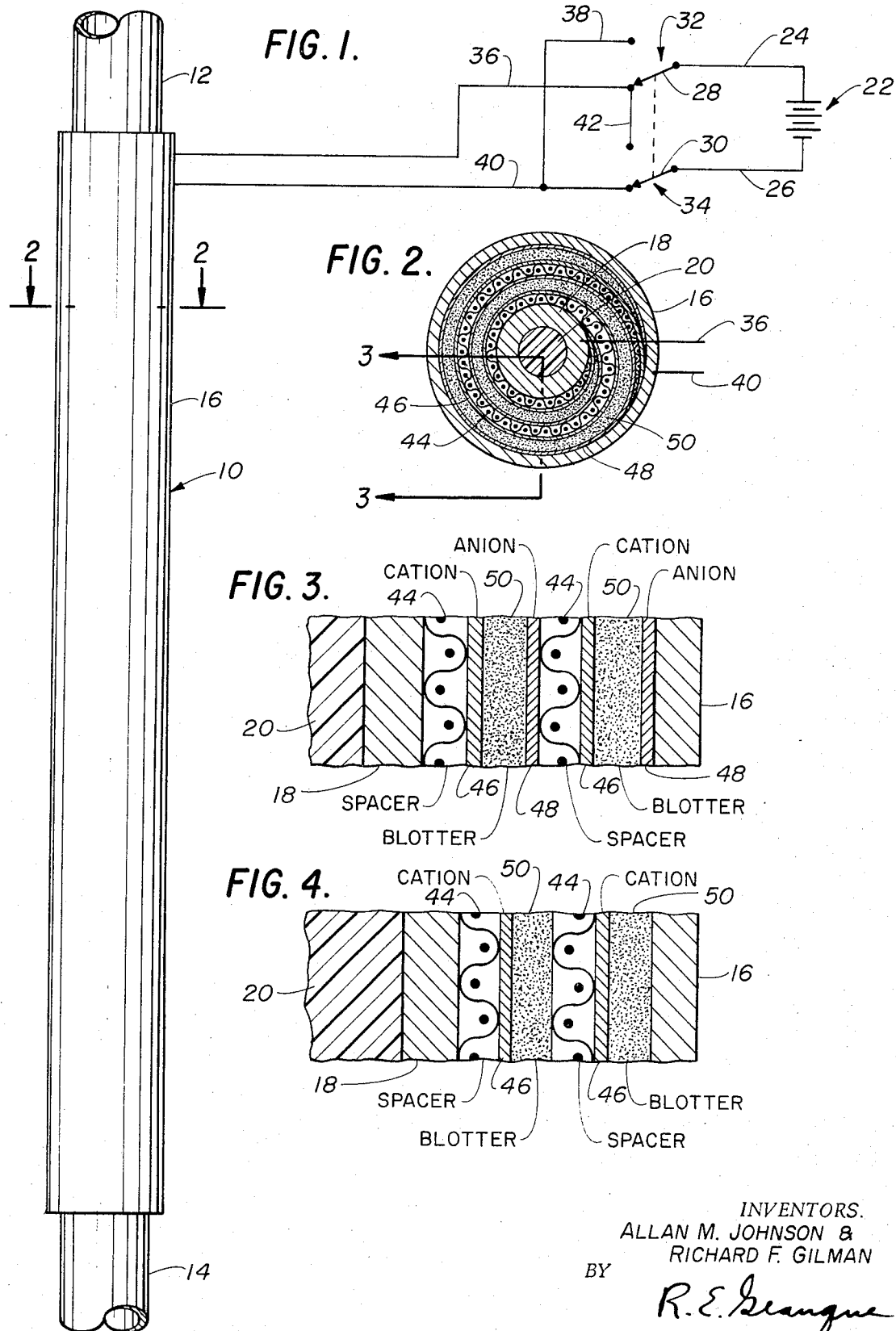

3,697,410
ELECTRODIALYSIS DEMINERALIZATION APPARATUS
Allan M. Johnson, Reseda, and Richard F. Gilman, Simi, Calif., assignors to CCI Aerospace Corporation, Van Nuys, Calif.
Filed Feb. 8, 1971, Ser. No. 113,509
Int. Cl. B01d 13/02; C02b 1/82
U.S. Cl. 204—301       9 Claims

ABSTRACT OF THE DISCLOSURE

An apparatus to effect demineralization of water by the process of electrodialysis wherein an ion exchange membrane and a salt storage element are located in a cross sectional spiral configuration, the water to be demineralized by passing through the apparatus also in a cross sectional spiral configuration.

BACKGROUND OF THE INVENTION

The field of this invention relates to an apparatus for desalting or demineralizing a fluid such as salt water, and more particularly, to an apparatus that is based upon a reversible electrodialysis process.

Electrodialysis is a process by which the dissolved substances can be separated from colloids by diffusion through a membrane. In electrodialysis, the dialyzing chamber is placed between two electrodes, with pure water in compartments in either side. Under the influence of a direct current, the charged ions migrate from the solution to the oppositely charged electrodes.

Heretofore, the process of electrodialysis has been proved to be useful in removing minerals usually in the form of salt that are dissolved in water. In recent years the efficiency of such a process has been greatly magnified by use of an ion permeable membrane. An ion permeable membrane is a film or sheet of a substance which is preferentially permeable to a particular type of ion. This selectivity is exhibited during electrical transport of ions across the membrane under an electrical potential. One method of making such a membrane is to take a fiber base and "paint" on both sides of the fiber with a material containing a finely ground cation exchange resin. Such a resin would be sulphonated polystyrene-divinyl benzene copolymer. As a result, this membrane would permit diffusion therethrough of cations. An anion permeable membrane is made in essentially the same way except that the material with which it is "painted" permits diffusion of anions through the membrane. Each salt material such as sodium chloride (chemical symbol NaCl) is composed of the anion chloride and the cation sodium. By employing the use of such membranes in electrodialysis, salts which are formed of minerals can be removed from a water solution.

The normal procedure for the use of such membranes in an electrodialysis process is to physically locate a plurality of such sheet like configurated membranes in a spaced apart parallel relation. The membranes are to alternate in the anion type to the cation type. The water to be demineralized is then passed through alternate spaces between the membranes with waste water being conducted through the odd numbered alternate spaces. As a result, salt is removed from the product water and is caused to pass through the membrane into the waste water. The waste water is then disposed of and the product water is employed for its desired use.

There have been many disadvantages of this type of process. For example, it is complicated to build and is sensitive in operation to plumbing defects. Also, the physical size of such an apparatus comprising a plurality of sheet like membranes held together by the massive framework is rather substantial. Further, it has been difficult in the past to construct such a device at low cost. It is desirable that the membranes be located in a closely spaced parallel relation to one another. Heretofore, this has been extremely difficult to accomplish without substantial manufacturing cost.

SUMMARY OF THE INVENTION

The apparatus of this invention is to facilitate the demineralization of water by the process of electrodialysis. A blotter material is to be employed which has the inherent capability of storing in a stationary manner a predetermined volume of water. At least a single ion permeable membrane to be placed adjacent the blotter with a spacer material being located adjacent the membrane. It is to be noted that in a modification of this invention, a second ion permeable membrane may be located on the opposite side of the blotter. If two such membranes are employed, one of the membranes would be of the cation type with the second membrane being of the anion type. The blotter material must be sufficiently porous to permit the entrance of water thereto but does not permit flow through the blotter. The spacer is to be formed of the material which includes a plurality of physical apertures to actually permit free flow of water through the spacer. The combined arrangement of the spacer, blotter and membrane (or membranes) is then wound about an inner electrode. The final configuration results in a spiral cross sectional arrangement. An annular outer electrode is then placed about the exterior surface of the arrangement. A DC potential is to be applied between the inner and outer electrodes with the potential being reversible. The electrodes consist of a porous nonconsumable material (such as activated carbon) which are reversibly changeable as electrolitic capacitors.

BRIEF DESCRIPTION OF THE DRAWING

FIG. 1 is an overall view of the apparatus of this invention as it would be employed to effect demineralization of water;

FIG. 2 is a cross sectional view through the apparatus of this invention taken along line 2—2 of FIG. 1;

FIG. 3 is a longitudinal cross sectional view through the apparatus of this invention taken along line 3—3 of FIG. 2; and FIG. 4 is a view similar to FIG. 3 but showing the apparatus of this invention wherein only a single type of ion permeable membrane is employed.

DETAILED DESCRIPTION OF THE SHOWN EMBODIMENT

Referring particularly to the drawing there is shown in FIG. 1 the demineralizing apparatus of this invention being employed in combination with conduits 12 and 14. The exterior surface of the apparatus 10 is formed into an outer electrode 16. Outer electrode 16 is generally annular shaped and inner electrode 18 is mounted about a central solid core 20. Inner electrode 18 is also to be annularly shaped and concentrically located within the outer electrode 16 and spaced from the outer electrode 16. It is envisioned that the central core 20 be formed of a non-magnetic solid material such as plastic or the like. However, it is to be considered within the scope of this invention to form the inner electrode 18 as a solid unit thereby eliminating the need for the core 20.

An electric field is to be supplied between the electrode 16 and 18 by means of a DC potential 22. The potential 22 is connected by means of conductors 24 and 26 to the movable tap 28 and 30 of the respective switches 32 and 34. Switches 32 and 34 are to be ganged and activated simultaneously. The movable tap 28 of the switch 32 is movable from the position of connecting conductor 24 and conductor 36 to the position of connecting conductor 24 and conductor 38. Conductor 38 is directly connected with conductor 40. The movable tap 30 of the switch 34 is movable from the position connecting conductors 26 and 40 to the position of connecting together conductors 26 and 42. Conductor 42 is directly connected to the conductor 36. Conductor 40 is connected to the outer electrode 16 with the conductor 36 being connected to the inner electrode 18.

With the switches 32 and 34 in the position as shown in FIG. 1 of the drawing, an electric field is applied between the inner electrode 18 and the outer electrode 16 in a particular direction. Upon activation of switches 32 and 34 causing a connection of conductors 26 and 42 and conductors 24 and 38, the electric field that was being applied between the inner electrode 18 and the outer electrode 16 has now been reversed. The reason for it being necessary to reverse the electric field will become apparent further on in this specification. It is to be noted that the switching arrangement depicted by switches 32 and 34 is only to be illustrative of a particular way in which a reversible electric field may be applied between electrode 16 and 18. In actual practice, other more desirable forms of applying a reversible electric field may be employed.

The material of construction of the electrodes 16 and 18 will normally take the form of a granular or porous carbon. The electrodes 16 and 18 may also comprise treated carbon wherein the treatment of the carbon electrodes is desired to produce cation and anion responsive electrode materials. Such a treating of carbon usually takes the form of applying a cation or anion responsive material in fluid form in effecting the polymerization of the material on the carbon particles. Such heat treating of carbon electrodes is described in U.S. Pat. No. 3,515,664.

Within the space between the inner electrode 18 and the outer electrode 16 is to be located the demineralizing unit of this invention. The unit can take either the form of FIG. 3 or the form of FIG. 4 of the drawing. In the form of FIG. 3 it is composed of the combination of a spacer, a blotter, an anion permeable membrane, and a cation permeable membrane. In the unit of FIG. 4 the unit is composed of a spacer, a blotter, and a cation permeable membrane. Both the units of FIG. 3 and FIG. 4 are to be constructed in the same manner which is to be described as follows: Each of the elements are to be initially secured in sheet form. The spacer is to be formed of a material of expanded plastic resembling window screening. However, other types of material could be employed, it only being required that the water to be demineralized is capable of establishing a thin flow path down through the spacer material. Also, the spacer can be formed of an anion or cation permeable material, in other words, including ion exchanging resin threads or ion exchanging resin beads. It has been found in the past that to form such a spacer facilitates the passage of the current thereto. However, it is to be understood that the inventor does not desire to be limited to this particular form of spacer.

A blotter 50 is to be constructed of a porous material which permits a fluid such as water to be held in situ within the blotter 50. The blotter 50 may take the form of either a cloth or a felt-like material. It is important that the blotter 50 does not permit flow of fluid therethrough, that in essence the water remains stagnant within the blotter 50.

The cation permeable membrane may be constructed of a fibrous material which has been painted on both sides with a paint including a finely ground cation exchange resin. The anion permeable membrane may also be constructed of a fibrous material which has been painted on both sides with a paint including a finely ground anion exchange resin.

To form the unit of FIG. 3, the blotter in sheet form is placed between the anion permeable membrane and the cation permeable membrane. The spacer is then located upon either the cation membrane or adjacent the anion membrane. The inner electrode 18 which has been secured to the core 20 should be in a basically cylindrical form. The electrode 18 and associated core 20 are then placed upon the stack composed of membranes, blotter, and spacer (the demineralization unit). The stack is then wound about the electrode 18 similar to the manner of rolling a newspaper. As a result, a spiral cross sectional configuration results with respect to the unit included within this invention. What actually occurs is that a plurality of spacers are located radially outward from each other with a plurality of blotters being similarly located with a plurality of membranes being similarly located. Once the resultant spiral configuration is completed, the outer electrode 16 is placed about the unit thereby resulting in completion of the apparatus of this invention. Conductor 40 is electrically connected to the outer electrode 16 with conductor 36 being electrically connected to the inner electrode 18. The apparatus 10 is then ready to function.

It is important to note that there is no need for any additional structure to support the location of the membrane blotters and spacers. The support comes from winding one upon the other to a spiral configuration. Further, the apparatus 10 of this invention can be constructed much more inexpensively than conventional ion exchange demineralizing apparatuses of the prior art.

The operation of the unit of FIG. 3 of this invention is as follows: Upon the institution of an electric field by means of DC potential 22 through the unit located between the electrodes 16 and 18, the salt located within the water flowing through the spacer 44 is broken down into its component parts. If, for example, the salt takes the form of sodium chloride (NaCl) the sodium cation ($Na^+$) is caused to pass through the cation permeable membrane 46. At the same time, in order to maintain electroneutrality, the anion ($Cl^-$) located within the water within the spacer 44 is caused to pass through the anion permeable membrane 48. Because of the construction of the cation and anion membranes, only cations are permitted to pass through the cation permeable membrane with the anions only being permitted to pass through the anion permeable membrane. It is to be noted that each blotter is bordered on each side by an anion permeable membrane and a cation permeable membrane. Therefore, the cations which are passed from the spacer into the blotter, meet with the anions coming from the next adjacent spacer which has been transmitted through the anion permeable membrane. An anion and a cation thereby combine maintaining electroneutrality back into the original salt form. Thus it can be seen that the sodium and chloride ions are removed from water flowing within the spacer 44 thereby producing product water, and that the sodium and chloride ions are added to the water held stagnant (or in situ) within the blotter 50, to produce brine.

After a period of time the blotter 50 will become filled with salt and is not capable of absorbing further cation and anions. Therefore, it is necessary to effect reversal of the electric field to clean out the blotter 50. The salt is removed from the blotter and transmitted back into the water flowing through the spacers. During the time of the reversal, the water then flowing through the spacer becomes brine and is disposed of exteriorally of the apparatus. The reversal of the potential is maintained for a sufficient period of time to effect the cleaning out of the salt from the blotter. At such a time, the electric field is again reversed and the apparatus again functions as a demineralizer, thereby removing salt from the water flowing through the spacer 44, thereby producing product water.

In the embodiment of FIG. 4 the only difference is the elimination of the anion permeable membrane 48. It has been found that during use the anion permeable membrane tends to become laden with scales resulting in a large voltage drop across this membrane. As a result, the major portion of the voltage drop occurs across the anion permeable membrane with very little voltage drop occurring across the cation membrane. Therefore, complete destruction of the apparatus could occur.

When scale occurs to a significant amount, the anion permeable membrane can be replaced. However, in some instances this can be undesirable and therefore the apparatus of FIG. 4 is employed. Basically, the unit of FIG. 4 is constructed in the same manner with the cation permeable membrane being located between a blotter and a spacer. The other side of the blotter is located directly adjacent a spacer instead of the anion membrane. It is to be noted that scale is not produced upon the cation permeable membrane. For this reason the cation membrane proves to be most desirable. Because on one side the blotter 50 and the spacer 44 are joined, there is bound to occur a small amount of leakage of salt water back into the spacer. However, in most instances this amount of leakage is sufficiently small so it is not of major importance. Upon the instituting of electric current in the desired direction, the cations from the water are caused to move through the cation permeable membrane into the blotter. In order to preserve electroneutrality within the spacer, the anions are then caused to move in the opposite direction also into the blotter. As a result, the electroneutrality is maintained with anions coming from one direction and cations coming from the other direction, combining within the blotter to form a salt solution.

Upon reversal of the electric current, the salt is removed from the blotter back into the water within the spacer with that water being disposed of as previously described. A disadvantage of the apparatus of FIG. 4 versus the apparatus of FIG. 3 is that current efficiency is decreased. Current efficiency is described as the amount of current necessary to demineralize a given amount of water. However, in some situations it is desirable to increase the demineralizing time in order to avoid the replacement after a period of time of an anion permeable membrane. For this reason, the apparatus of FIG. 4 is most desirable.

While the operation of the apparatus 10 of this invention has been described in connection with the removal of sodium and chloride ions, these ions are referred to as only being illustrative of the operation of the invention. The apparatus of this invention also removes from brackish water other cations such as calcium, magnesium, and potassium and also other anions such as $SO_4$, $HCO_3$, and $NO_3$.

What is claimed is:
1. An electrodialysis demineralizing apparatus comprising:
   first means for conducting fluid to be demineralized through said apparatus;
   second means for extracting ions from said fluid;
   third means to absorb and store said ions separate from said fluid;
   said first means being located directly adjacent said second means with said second means being located adjacent said third means, said first means and said second means and said third means forming a unit, said unit being in the configuration of a spiral.
2. Apparatus as defined in claim 1 wherein:
   said second means including at least one ion permeable membrane.
3. Apparatus as defined in claim 2 wherein:
   said membrane comprising a cation permeable membrane.
4. Apparatus as defined in claim 1 wherein:
   said second means includes a cation permeable membrane and an anion permeable membrane.
5. Apparatus as defined in claim 1 wherein:
   said third means includes a volume of fluid in situ.
6. Apparatus as defined in claim 5 wherein:
   said third means comprises a porous material.
7. Apparatus as defined in claim 6 wherein:
   said second means includes at least one ion permeable membrane.
8. Apparatus as defined in claim 7 further comprising means to supply an electric field across said unit, said field being reversible.
9. Apparatus as defined in claim 8 wherein:
   said means to apply said electric field includes at least a pair of electrodes, said electrodes being primarily capacitive in nature.

References Cited
UNITED STATES PATENTS

| 2,741,595 | 4/1956  | Juda     | 204—301    |
| 3,192,148 | 6/1965  | Chen     | 204—301    |
| 3,198,725 | 8/1965  | Kollsman | 204—301    |
| 3,219,567 | 11/1965 | Lacey    | 204—301 XR |

HOWARD S. WILLIAMS, Primary Examiner

A. C. PRESCOTT, Assistant Examiner

U.S. Cl. X.R.

204—180 P